Feb. 14, 1956     C. V. KRICHTON     2,734,983
WAFFLE BAKER
Filed April 2, 1952     2 Sheets-Sheet 1
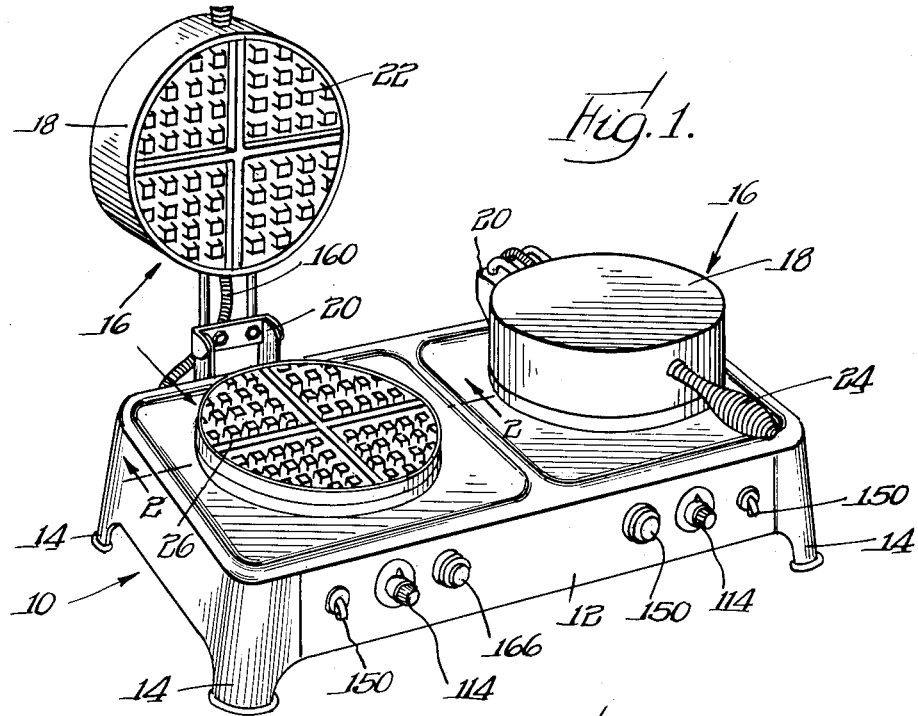
INVENTOR.
Carl V. Krichton
BY
Karl H. Sommermyer
atty Feb. 14, 1956
C. V. KRICHTON
2,734,983
WAFFLE BAKER
Filed April 2, 1952
2 Sheets-Sheet 2
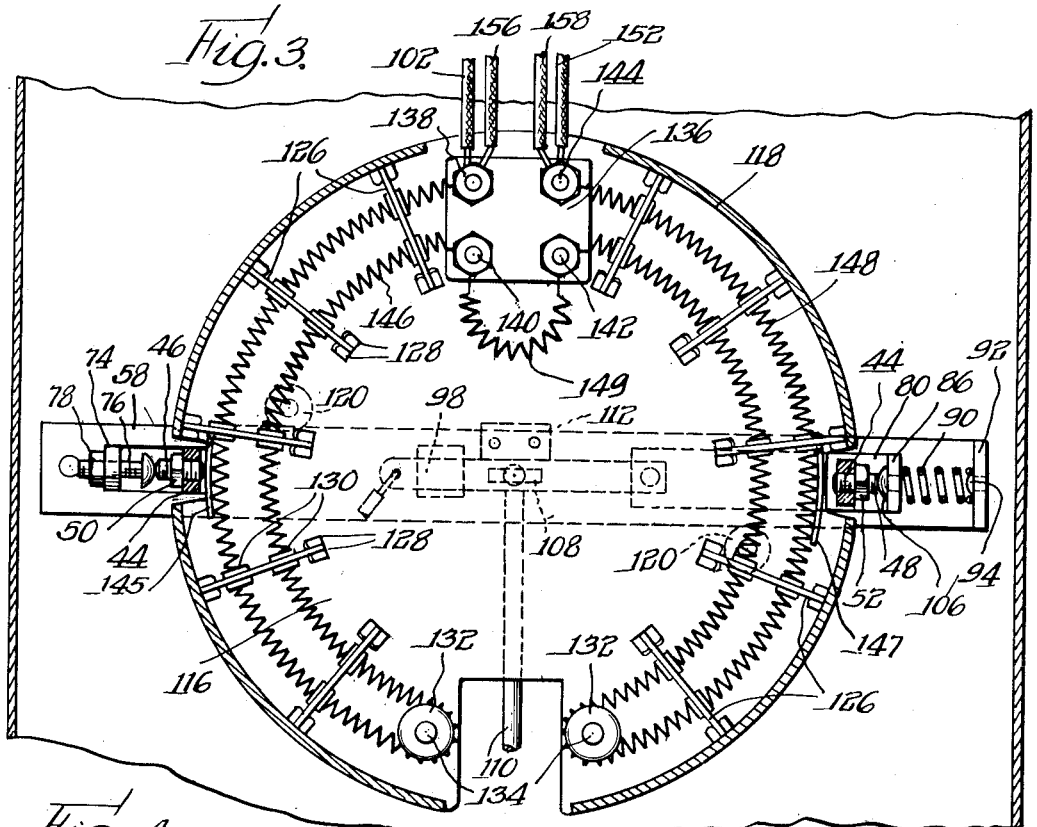
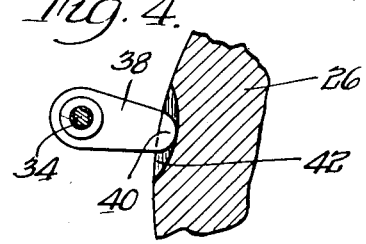
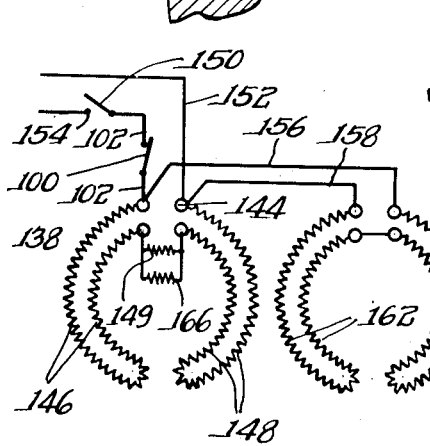
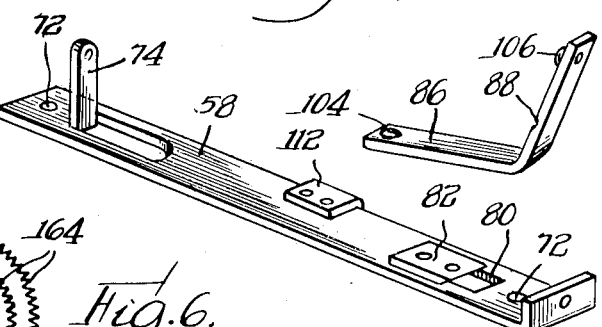
INVENTOR.
Carl V. Krichton
BY
Karl H. Sommermeyer
Atty.

United States Patent Office 2,734,983
Patented Feb. 14, 1956

2,734,983
WAFFLE BAKER

Carl V. Krichton, Geneva, Ill., assignor to McGraw Electric Company, Elgin, Ill., a corporation of Delaware Application April 2, 1952, Serial No. 279,970

14 Claims. (Cl. 219—19)

This invention is concerned with a waffle baker, and particularly with a removable grid waffle baker in which the grid acts as a part of a thermostatic control element.

In baking waffles and the like some means is necessary for preventing the cooked material from sticking to the grids or the like. At one time it was necessary to grease the grids periodically to prevent sticking. Present-day waffle grids need not be greased; a silicone compound is baked on the grids as a part of the manufacturing operation. In domestic use the coating may last many years, but in commercial use the coating must be renewed periodically. The grids must be removed and returned to the factory for baking on a new coating of silicone compound.

It has been found heretofore that in a waffle iron or similar cooking utensil having a relatively thin cooking plate of high heat conductivity the temperature of the waffle grid or the like varies in definite relation to the surface temperature of the batter, and that the waffle grid temperature therefore may be used as an indication of the degree to which the waffle has been baked.

Present-day waffle grids and the like are generally constructed of aluminum or aluminum alloy which has both high thermal conductivity and a relatively high coefficient of thermal expansion. Thus it has been proposed that the waffle grid or other cooking plate be used as one element of a thermostatic control. When the waffle grid is used as one element of a thermostatic control the problem arises of removing a grid for recoating with the silicone compound without requiring removal of all of the thermostatic control and without requiring recalibration.

An object of this invention is to provide a thermostatically controlled waffle iron with removable grids.

Another object of this invention is to provide removable grids in a waffle iron in which the grid temperature is utilized as an indication of the degree to which the waffle is baked.

A more particular object of this invention is to provide a removable grid in a waffle iron wherein the grid acts as one element of a thermostatic control.

Another object of this invention is to provide interchangeable grids for a waffle iron in which a grid acts as one element of a thermostatic control without requiring recalibration of said control.

Other objects and advantages of the present invention will be apparent from the following description when taken in connection with the accompanying drawings wherein like numerals are utilized to identify similar parts throughout, and in which:

Fig. 1 is a perspective view of a waffle iron embodying the features of my invention;

Fig. 2 is a cross-sectional view through the grid and control mechanism as taken substantially along the line 2—2 of Fig. 1;

Fig. 3 is a top view of the heating coils and control mechanism taken substantially along the line 3—3 of Fig. 2;

Fig. 4 is a top view of one of the members for holding the grid in place as taken along the line 4—4 of Fig. 2;

Fig. 5 is a perspective view of parts of the thermostatic control mechanism exclusive of the waffle grid; and Fig. 6 is a schematic wiring diagram of the waffle iron.

Referring first to Fig. 1 there is shown a waffle baker 10 comprising a substantially rectangular sheet metal base or casing 12 having depending legs 14 at the four corners thereof. The waffle baker 10 includes two identical waffle baking units 16, each having a circular lid 18 hinged to the base at 20. Each lid 18 carries a waffle baking grid 22, and each lid is provided with a handle 24 which may be a thermally insulated handle or of the spiral wire type designed to dissipate heat rapidly to the atmosphere.

Each waffle baking unit 16 further includes a lower grid 26 (Figs. 1 and 2). All of the grids 22 and 26 are provided with the usual surface projections common to waffle grids. The lower grids 26 fit in circular apertures in the top plate 28 of the base 12, which plate is upturned around each grid to form a rim 30 on which a peripheral flange 31 on each grid is supported. A plurality of bosses 32 is welded or otherwise suitably secured to the under side of the plate 28 in arcuately spaced relation about each grid 26. Studs 34 having slotted heads 36 are rotatably mounted in the bosses 32, and holding members or fingers 38 (Figs. 2 and 4) are peened or otherwise fixedly secured to the lower ends of the studs. The tips 40 of the fingers fit into suitable slots 42 in the grids 26 to hold the grids in place. Rotation of the studs 34 by a screw driver or the like remove the tips 40 of the fingers 38 from the slots 42 to free the grid 26 for removal.

Since each waffle baking unit 16 is identical, the remainder of the description will be limited to one of the units. The grid 26 includes, in addition to the parts heretofore enumerated, a pair of spaced apart arms 44 formed integral with the grid and extending downwardly therefrom. The arms 44 are substantially diametrically spaced, and set screws 46 and 48 are threaded into the arms and are locked in place by jam nuts 50 and 52. Cam surfaces 54 and 56 are provided leading up to the set screws 46 and 48 respectively.

A reference strip 58 (Figs. 2, 3 and 5) having a coefficient of expansion different from that of the aluminum or aluminum alloy of the grids is mounted loosely on angle brackets 60 on the base 12. Preferably the reference strip 58 has a zero or very low coefficient of expansion. "Nilvar" is a preferred material for this strip. The angle brackets are riveted or otherwise suitably secured to a side wall 62 of the base and to a separator plate 64 mounted midway between the waffle baking units 16 and riveted or otherwise secured at its lower end to the sheet metal floor 66 of the base or casing 12. The angle brackets 60 are provided with elongated slots 68 and shouldered screws 70 are passed through these slots and threaded into suitable apertures 72 in the strip 58. The strip 58 thus effectively floats on the brackets 60 so that the strip has no strain imposed upon it by its mountings and so that it is free to shift slightly longitudinally for centralization as will be apparent shortly.

An arm 74 (Figs. 2, 3, and 5) is struck upwardly from the body of the strip 58 near one end thereof and is substantially parallel to one of the grid arms 44. A screw 76 is threaded through the upper end of the arm 74 and a jam nut 78 is threaded over the screw for locking the screw in position. The head of the screw 76 in the strip arm 74 engages the outer end of the screw 46 in the grid arm 44. The inclined or cam surface 54 on the arm 44 aids in proper relative positioning of the screws when the grid is inserted.

The strip 58 is provided with an aperture 80 adjacent the other end and a metallic block 82 is riveted or otherwise secured to the strip 58 and has a knife edge 84 jutting out over the aperture 80. The block 82 must be made from a hard material to prolong the life of the knife edge 84 and may be made from the same metal as the strip 58, which preferably has a very low coefficient of expansion, so that the horizontal reference distance between the knife edge 84 and the head of the screw 76 will have a predetermined value when the strip has reached a predetermined temperature. Preferably the reference distance remains substantially constant once the screw has been locked in position by the nut 78. It will be seen that the block 82 is sufficiently small that its dimensional changes with temperature variations are insignificant and that the block therefore need not necessarily be made of the same material as the strip 58.

An L-shaped arm 86, preferably of the same low expansion metal as the strip 58, fits through the aperture 80. The arm 86 is provided with a transverse groove 88 for receiving the knife edge 84, and the knife edge and groove are held in engagement by a coil spring 90 compressed between the arm and an upturned tail 92 on the strip 58. The tail 92 is provided with a struck out protuberance 94 for holding the spring in proper position.

An insulating block 96 (Fig. 2) is mounted on the under side of the strip 58 and carries a pair of resilient switch members 98 having switch contacts 100. Wires 102 are suitably fixed to the ends of the switch members. The switch contacts 100 normally are closed, and an insulator 104 of material such as porcelain is secured on the lower end of the L-shaped arm 86 and engages the extending end of the upper member 98 from below. The upper end of the arm 86 is provided with a struck out protuberance 106 adapted to engage the end of the screw 48 in the grid arm 44.

The position of the lower switch member 98, and hence the degree of brownness to which a waffle is baked, is determined by a cam member 108 (Figs. 2 and 3) mounted on a rod 110, the inner end of which is supported by a bracket 112 on the center of the strip 58. The outer end of the rod 110 is suitably journaled in the casing 12 and is supplied with a knurled control knob 114 (Fig. 1) for rotating the rod and the cam 108.

A flat metallic plate 116 (Figs. 2 and 3) having an upturned peripheral edge 118 is mounted on top of a pair of posts 120 a short distance below the bottom grid 26. The posts 120 have reduced lower ends 122 fitting through apertures in the bottom plate 66, and nuts 124 are threaded on these reduced ends to fix the posts in position.

Spacers 126 consisting of sheets of mica or other insulating and heat resisting material are secured at spaced intervals around the plate 116 by means such as fingers 128 struck upwardly in pairs from the plate 116 and gripping the ends of the spacers 126. Each of the spacers 126 is provided with a pair of horizontally spaced apertures through which metal grommets 130 are passed. The plate 116 is provided with a pair of supports 132 which are of heat resistant and electrically non-conductive material such as porcelain. The supports 132 are mounted by means such as rivets 134 passing through the supports and through the plate 116. An insulated block 136 of substantially rectangular configuration is suitably fixed on the plate 116 substantially diametrically opposite to the porcelain or like supports 132. The block 132 is provided with four bolts and nuts 138, 140, 142 and 144, which are spaced from the plate 116 by means such as cut-outs in the plate. A heating coil 146 has its ends secured to the bolts and nuts 138 and 140 and extends through the metal grommets 130 in half of the spacers 126, the mid portion of the heating coil 146 being supported by one of the porcelain or similar supports 132. Similarly, a heating coil 148 has its ends fixed to the bolts 142 and 144 and passes through the metal grommets 130 in the remainder of the spacers 126, its mid portion being supported by the other porcelain or similar support 132. Suitable shields 145 and 147 (Figs. 2 and 3) of mica or the like are positioned along a short arc of the exterior of each of the coils 146 and 148 positively to maintain the coils insulated from the grid arms 44, the plate 116 being cut away to accommodate these arms. A short resistance coil 149 is secured between the bolts and nuts 140 and 142 to place the heating coils 146 and 148 in series, and also to provide a dropping resistor for a pilot light potential as will be apparent shortly.

One of the wires 102 (Figs. 2, 3, and 6) is secured to the nut and bolt 138 at one end of the heating coil 146, while the other wire 102 passes to a switch 150 located at the front of the base 12 as shown in Fig. 1. The nut and bolt 144 are provided with a connecting wire 152 (Figs. 3 and 6). The wire 152 and a wire 154 from the switch 150 lead to a drop cord which is common to both of the heating units 16, i. e. there are two wires 152 and two wires 154 connected in parallel to a conventional two-wire drop cord.

Wires 156 and 158 (Fig. 6) lead from the nuts and bolts 138 and 144 to the hinged lid 18 of the heating unit 16. These wires are protected by a flexible sheath 160 (Fig. 1) such as a spirally coiled steel wire. The upper grid 22 is provided with a conventional heating unit comprising a pair of resistance wires 162 and 164 similar to the coils 146 and 148 and arranged directly in series.

A pilot light 166 (Figs. 1 and 6) on the front of the casing 112 is connected in parallel with the short resistance coil 149, the voltage drop across this resistance coil being suitable to light a common six volt pilot light bulb.

The spacing between the outer ends of the screws 46 and 48 is adjusted to have a predetermined value with the waffle grid at some specified temperature, such as 400° F. The switch contacts 100 are normally closed. The grid 26, being made of aluminum or aluminum alloy, expands quite rapidly with increasing temperature, and the arms 44 and screws 46 and 48 carried thereby therefore move apart rapidly. The horizontal reference distance between the head of the screw 76 and the knife edge 84 preferably remains substantially constant, although it is only necessary that the reference distance change at a different rate than the spacing between the screws 46 and 48 and be at the predetermined distance at the specified temperature. Therefore, as the spacing between the ends of the screws 46 and 48 increases with increasing temperature, the screw 48 abutting the protuberance 106 pivots the L-shaped arm 86 in a clockwise direction as seen in Fig. 2. This is against the normal counterclockwise biasing of the arm 86 by the spring 90 which impinges against the arm slightly above the knife edge 84 and by the upper resilient switch member 98. When the predetermined temperature and spacing have been reached, the L-shaped arm 86 has been pivoted a sufficient distance to open the contacts 100, thereby de-energizing the heating coils of that particular waffle baking unit to prevent further baking. The grid 26, strip 58, the L-shaped arm 86, and the switch members 98 and contacts 100 thus act as a thermostatic control for the waffle baking unit 16. De-energization of the heating coils causes the pilot light 166 to be extinguished, and the operator then knows that the waffle is done and should be removed. The degree of brownness to which the waffle is done can be adjusted by rotating the knob 114 and hence the cam 108 to determine the position of the lower switch member 98 and hence the time at which the contacts 100 open.

When it is desired to remove the lower grid to renew the silicone coating, or because of physical damage to the grid, or for any other reason, all that is necessary is to rotate the studs 34 by means of a screw driver to remove the finger tips 38 from the grid slots 42. The grid then can be lifted straight up and out. Upon re-insertion of the re-coated grid, or upon insertion of any other grid, all that is necessary is to lower the grid into place. The inclined or cam surfaces 54 and 56 on the grid arms 44 insure proper centralization of the strip 58 relative to the grid so that the screws 46 and 48 readily engage the head of the screw 76 and the protuberance 106. The spacing between the ends of the screws 46 and 48 remains constant (for any given temperature) once the spacing has been predetermined in manufacture, and the horizontal distance between the head of the screw 76 and the knife edge 84 similarly remains constant. Therefore no calibration is necessary upon replacement of the grid 26 by itself or by any other similar grid. Reverse rotation of the studs 34 then positions the finger tips 40 in the slots 42 to lock the grid 26 in place.

The upper grid 22 is held in the lid 18 by any suitable detachable fastening means and is readily removed for recoating or other purposes since it does not form a part of a thermostatic element and is not connected to the electrical wiring or mounting therefor.

Although a particular embodiment of this invention has been shown and described, it will be apparent that this is for illustrative purposes only and that the invention includes all that which falls within the spirit and scope of the appended claims.

It will be seen that I have disclosed an improved thermostatically controlled waffle baker wherein the grids can be readily and quickly removed for renewal of the silicone coating, for repair or replacement, or for any other purpose. Removal and replacement of the grids in no way disturbs the heating elements, the thermostatic control mechanism, the electrical contacts, or the brownness control. The grids therefore can be removed and replaced by anyone, with consequent savings in time and money and without removing the waffle baker from service for more than a minute or so.

I claim:

1. A waffle baker or similar cooking utensil comprising a base, a cooking plate having a predetermined coefficient of expansion, means for detachably supporting said cooking plate from said base, means for heating said cooking plate to cook a batter thereon, means for supporting said heating means in juxtaposition to said cooking plate, means for controlling the operation of said heating means, a member having a predetermined coefficient of expansion different from that of said cooking plate, means exclusive of said plate for supporting said member from said base in the vicinity of said cooking plate and in readily separable relation thereto, and means for comparing the different degrees of expansion of said cooking plate and said member to effect operation of said controlling means.

2. A waffle baker or similar cooking utensil comprising a base, a cooking plate having a predetermined coefficient of expansion, means for detachably supporting said cooking plate from said base, means for heating said cooking plate to cook a batter thereon, means for supporting said heating means in juxtaposition to said cooking plate, means for controlling the operation of said heating means, a member having a predetermined coefficient of expansion different from that of said cooking plate, means exclusive of said plate for supporting said member from said base proximate to and in readily separable relation to said cooking plate, means for comparing the different degrees of expansion of said cooking plate and said member to effect operation of said controlling means, and means for manually varying the effect of said controlling means on the operation of said heating means.

3. A waffle baker or similar cooking utensil comprising a base, a cooking plate having a predetermined coefficient of expansion, said cooking plate having two points spaced apart a predetermined distance at a predetermined temperature, means for detachably supporting said cooking plate from said base, means for heating said cooking plate to cook a batter thereon, means for supporting said heating means in juxtaposition to said cooking plate, means for controlling the operation of said heating means, a reference standard for measuring said predetermined distance for effecting operation of said controlling means when said two points become spaced apart said predetermined distance, and means exclusive of said plate for supporting said reference standard from said base in readily separable relation to said cooking plate.

4. A waffle baker or similar cooking utensil comprising a base, a cooking plate having a predetermined coefficient of expansion, said cooking plate having two points spaced apart a predetermined distance at a predetermined temperature, means for presetting said predetermined distance, means for detachably supporting said cooking plate from said base, means for heating said cooking plate to cook a batter thereon, means for supporting said heating means in juxtaposition to said cooking plate, means for controlling the operation of said heating means, a reference standard for measuring said predetermined distance for effecting operation of said controlling means when said two points become spaced apart said predetermined distance, and means exclusive of said plate for supporting said reference standard from said base in readily separable relation to said cooking plate.

5. A waffle baker or similar cooking utensil comprising a base, a cooking plate having a relatively high, predetermined coefficient of expansion, said cooking plate having two points spaced apart a predetermined distance at a predetermined temperature, means for detachably supporting said cooking plate from said base, means for heating said cooking plate to cook a batter thereon, means for supporting said heating means in juxtaposition to said cooking plate, means for controlling the operation of said heating means, a reference standard having a relatively low predetermined coefficient of expansion and having two points spaced apart said predetermined distance at said predetermined temperature to effect operation of said controlling means when the two points on said cooking plate become spaced apart said predetermined distance, and means exclusive of said plate for supporting said reference standard from said base in readily separable relation to said cooking plate.

6. A waffle baker or similar cooking utensil comprising a base, a cooking plate having a predetermined coefficient of expansion, means for detachably mounting said cooking plate on said base, a plurality of spaced apart projections on said cooking plate within said base, means for heating said cooking plate to cook a batter thereon, means for supporting said heating means in juxtaposition to said cooking plate, means for controlling the operation of said heating means, and means for mounting said controlling means on said base independently of said cooking plate, said controlling means having structure having a coefficient of expansion different from that of the cooking plate and detachably interfitting with said plurality of projections on said cooking plate for controlling the operation of said heating means according to the temperature of said cooking plate and the corresponding distance between said projections.

7. A waffle baker or similar cooking utensil comprising a base, a cooking plate having a predetermined coefficient of expansion, means for detachably mounting said cooking plate on said base, a plurality of sections on said cooking plate and within said base, the spacing between said sections varying in accordance with the temperature of said cooking plate and having a predetermined value at a preselected temperature, electrical means for heating said cooking plate to cook a batter thereon, means for supporting said electrical heating means in juxtaposition to said cooking plate, a pair of switch contacts in circuit with said electrical heating means and controlling the operation thereof, switch contact operating means, and means independent of said plate for mounting the switch contact operating means on said base, said switch contact operating means separably interfitting with said sections for operating said switch contacts when the spacing between said sections reaches said predetermined value corresponding to said preselected temperature.

8. A waffle baker or similar cooking utensil comprising a base, a cooking plate having a predetermined coefficient of expansion, means for detachably mounting said cooking plate on said base, a plurality of spaced sections integral with said grid and within said base, said sections being spaced apart a predetermined distance when said plate has reached a predetermined temperature, means for heating said cooking plate to cook a batter thereon, means for supporting said heating means from said base in juxtaposition to said cooking plate, means for controlling the operation of said heating means, a reference member having a predetermined coefficient of expansion different from that of said cooking plate and mounted on said base independently of said cooking plate, a projection carried by said reference member and engaging one of the sections on said cooking plate, a member movably carried by said reference member and engaging the other section on said cooking plate, means linking said movable member to said controlling means, and resilient means maintaining said movable member against the second mentioned section on said cooking plate.

9. A waffle baker or similar cooking utensil comprising a base, a cooking plate having a predetermined coefficient of expansion, means for detachably mounting said cooking plate on said base, a plurality of projections on said cooking plate housed within said base and spaced apart a predetermined distance when said cooking plate has reached a predetermined temperature, means for heating said cooking plate for cooking a batter thereon, means for supporting said heating means in juxtaposition to said cooking plate, means for controlling the operation of said heating means, reference means having a coefficient of expansion different from that of said cooking plate and having means interfitting with the projections on said cooking plate, means for mounting said reference means on said base independently of said cooking plate and free for limited movement to facilitate interfitting with the projections on said plate, and means cooperating with said reference means and said projections for operating said controlling means.

10. A waffle baker or similar cooking utensil as set forth in claim 9 wherein the projections on said cooking plate are provided with cam surfaces facilitating interfitting with the interfitting means of said reference means.

11. A waffle baker or similar cooking utensil comprising a base, a cooking plate having a predetermined coefficient of expansion, means for detachably mounting said cooking plate on said base, a pair of sections having cam-like portions on said cooking plate housing within said base and spaced apart a predetermined distance when said cooking plate has reached a predetermined temperature, means for heating said cooking plate for cooking a batter thereon, means for supporting said heating means in juxtaposition to said cooking plate, means for controlling the operation of said heating means, a member having a predetermined coefficient of expansion different from that of said cooking plate, said member having a pair of slots therein, means carried by said member and interfitting with the sections on said cooking plate, a pair of studs carried by said base and slidingly fitting in the slots in said member for mounting said member free for limited movement to facilitate interfitting with the cam portions of said sections, and means cooperable with said member and said sections for operating said control means.

12. A waffle baker or similar cooking utensil comprising a base, a cooking plate having a predetermined coefficient of expansion, means for detachably mounting said cooking plate on said base, a pair of integral projections on said cooking plate and extending into said housing, screw adjustment means on at least one of said projections for setting reference points on said projections spaced apart a predetermined distance when said cooking plate has reached a predetermined temperature, electrical heating means for heating said cooking plate to cook a batter thereon, means for supporting said electrical heating means from said base in juxtaposition to said cooking plate, a member having a very low coefficient of expansion different from that of said cooking plate, means for mounting said member on said base and free for limited movement, a projection integral with said member and extending laterally thereof, a lever pivoted on said member, said lever and the projection on said member contacting the reference points on the projections on said plate, the projections on said plate having cam surfaces facilitating engagement and disengagement of the projections and the lever, means actuated by said lever for opening said switch contacts when said cooking plate has reached a predetermined temperature and the projections thereon have reached said predetermined spaced apart distance, and means for manually adjusting the effect of said lever on the opening of said contracts.

13. A device for receiving and heating a cooking plate and for responding to its thermal changes in dimension for controlling the heating, comprising a base, heating means, means for supporting said heating means from said base, a cooking plate having a predetermined coefficient of thermal expansion, cooking plate supporting means on said base for detachably supporting the cooking plate adjacent said heating means, means for controlling operation of said heating means, means independent of the cooking plate supporting means for supporting said controlling means from said base, said controlling means including means having a coefficient of thermal expansion different from that of the cooking plate, and means interconnected with said last named means adapted for cooperative engagement with the cooking plate at spaced points.

14. A device as claimed in claim 13, wherein the means adapted for cooperative engagement with the cooking plate comprises a pair of spaced apart upstanding arms.

References Cited in the file of this patent

UNITED STATES PATENTS

| | | |
|---|---|---|
| 1,711,472 | Lewin | Apr. 30, 1929 |
| 1,907,199 | Hurxthal | May 2, 1933 |
| 1,963,655 | Fichtner | June 19, 1934 |
| 2,036,523 | Freemon | Apr. 7, 1936 |
| 2,102,879 | Benson | Dec. 21, 1937 |
| 2,102,892 | Fitzgerald | Dec. 21, 1937 |
| 2,237,147 | Ireland | Apr. 1, 1941 |
| 2,250,966 | Propernick et al. | July 29, 1941 |
| 2,517,253 | Spaeth | Aug. 1, 1950 |